(12) United States Patent
Guichard

(10) Patent No.: US 7,719,566 B2
(45) Date of Patent: May 18, 2010

(54) OPTICAL IDENTIFICATION DEVICE

(75) Inventor: Stephane Guichard, Andresy (FR)

(73) Assignee: Sagem Securite, Paris (FR)

( * ) Notice: Subject to any disclaimer, the term of this patent is extended or adjusted under 35 U.S.C. 154(b) by 19 days.

(21) Appl. No.: 10/250,314

(22) PCT Filed: Jan. 9, 2002

(86) PCT No.: PCT/FR02/00064

§ 371 (c)(1),
(2), (4) Date: Jun. 30, 2003

(87) PCT Pub. No.: WO02/056261

PCT Pub. Date: Jul. 18, 2002

(65) Prior Publication Data

US 2004/0062422 A1    Apr. 1, 2004

(30) Foreign Application Priority Data

Jan. 10, 2001    (FR)    ................. 01 00247

(51) Int. Cl.
*H04N 7/18* (2006.01)
(52) U.S. Cl. .................................................. 348/156
(58) Field of Classification Search ................. 382/116; 348/156
See application file for complete search history.

(56) References Cited

U.S. PATENT DOCUMENTS

| 4,636,622 A * | 1/1987 | Clark ........................ 235/380 |
| 4,821,118 A * | 4/1989 | Lafreniere .................... 348/156 |
| 4,831,402 A * | 5/1989 | Fujita et al. .................... 396/76 |
| 4,896,363 A * | 1/1990 | Taylor et al. ................. 382/125 |
| 5,230,025 A * | 7/1993 | Fishbine et al. .............. 382/127 |
| 5,635,981 A * | 6/1997 | Ribacoff ...................... 348/156 |
| 5,719,950 A * | 2/1998 | Osten et al. .................. 382/115 |
| 5,956,122 A | 9/1999 | Doster |
| 5,999,637 A * | 12/1999 | Toyoda et al. ............... 382/124 |
| 6,119,096 A | 9/2000 | Mann et al. |
| 6,133,941 A * | 10/2000 | Ono ......................... 348/14.05 |
| 6,526,160 B1 * | 2/2003 | Ito ............................. 382/117 |
| 6,636,635 B2 * | 10/2003 | Matsugu .................... 382/218 |
| 6,731,778 B1 * | 5/2004 | Oda et al. ................... 382/118 |
| 6,735,695 B1 * | 5/2004 | Gopalakrishnan et al. ... 713/186 |
| 6,912,299 B1 * | 6/2005 | Hoshino ..................... 382/124 |
| 2002/0034319 A1 * | 3/2002 | Tumey et al. ............... 382/116 |

FOREIGN PATENT DOCUMENTS

| EP | 0 758 776 | 2/1997 |
| EP | 1 020 811 | 7/2000 |
| EP | 1020811 A2 * | 7/2000 |
| WO | WO 94/22371 | 10/1994 |

OTHER PUBLICATIONS

Patent Abstracts of Japan, vol. 018, No. 379 (P-1771), Jul. 15, 1994 & JP 06 103368 A (Matsumura Electron:KK), Apr. 15, 1994 abstract.

* cited by examiner

*Primary Examiner*—David Czekaj
(74) *Attorney, Agent, or Firm*—Young & Thompson

(57) ABSTRACT

The invention concerns an optical identification device comprising a digital camera (4), the camera including a member for changing focal length between at least a visual observation focal length and a print recognition focal length, and the device including an automatic print recognition system (10), which is connected to the camera to be activated when the camera is in the print recognition focal length.

4 Claims, 1 Drawing Sheet

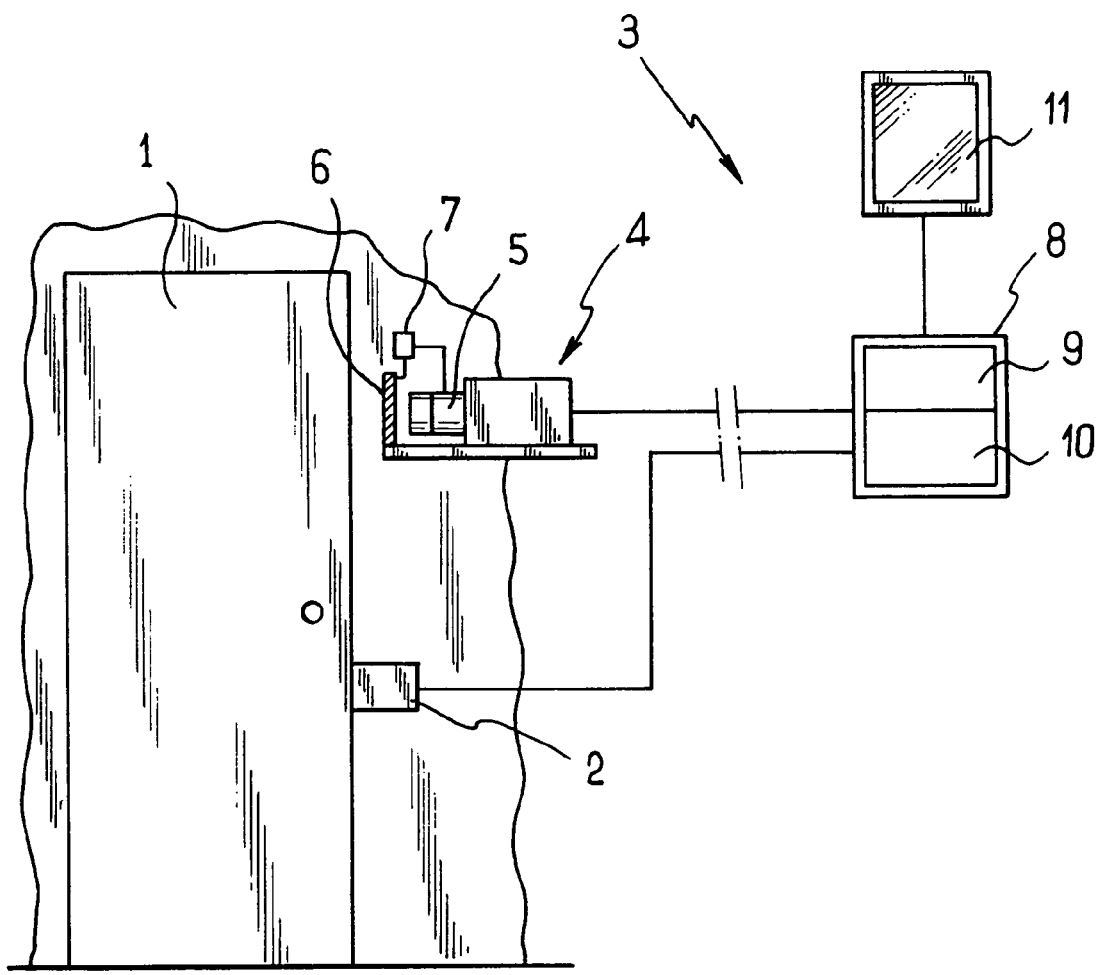

OPTICAL IDENTIFICATION DEVICE

The present invention relates to an optical identification device for use, for example, in association with a device for authorizing access to premises to which access is controlled.

Optical identification devices are known that comprise a digital camera which is placed close to the entrance to the controlled-access premises and which is connected to a monitor screen enabling a remote operator to view people presenting themselves at the entrance to the premises and to authorize access to the premises to people having the right to gain access thereto. Those devices suffer from the drawback in frequently-visited premises of requiring an operator to be present continuously.

Systems have therefore been developed for automatically recognizing faces, which systems are coupled to digital cameras to identify automatically people who present themselves to the entrance of the premises and to allow access to those people it recognizes as having the right to gain access. Those automatic face recognition systems include a memory containing characteristics of faces, and in particular their dimensional characteristics, and enabling identification to be performed without operator intervention by comparing the characteristics of a face being viewed with those contained in the memory. Nevertheless, there is a risk that a person who is normally authorized to access the premises will be refused access thereto because the system fails to recognize that person's face. This can be the result, for example, of the person wearing eyeglasses or a hat or indeed because the person's face presents some temporary change, such as a bruise, which spoils recognition.

There also exist identification devices that operate by automatically recognizing fingerprints, which devices are particularly effective. Nevertheless, those devices can give access only to people whose fingerprints have been stored in the database of the recognition device such that a newly-authorized person can gain access to the premises only after the database of the device has been updated. Furthermore, such devices require that people seeking to gain access to the premises stop and apply their hands to a sensor provided for this purpose in order to be able to recognize their fingerprints. Processing time is also relatively long. Those drawbacks are particularly troublesome when the identification device is used for authorizing access to premises that are visited very frequently.

An object of the invention is to provide simple means for enabling optical identification to be performed quickly and reliably.

In order to achieve this object, the invention provides an optical identification device comprising a digital camera, the camera possessing a focal length changing member for changing between at least one visual-observation focal length and one print-recognition focal length, and the device further comprising a system for automatic print recognition which is connected to the camera so as to be activated when the camera has adopted its print-recognition focal length.

Thus, when the visual-observation focal length is used, it is possible to obtain an image of a person's face for identification when that person is still relatively far away from the camera and is moving towards it. This focal length is used, for example, during periods of frequent visiting. With the print-recognition focal length, it is possible to perform automatic recognition of a print (where the term "print" is used generically to cover any type of print, and for example a fingerprint or an iris print), and in the event of automatic recognition failing, the visual-observation focal length can be used to allow an operator to perform recognition. This provides an identification system that is relatively simple and reliable.

In a first embodiment of the invention, the device includes a window mounted in front of the camera and associated with means for controlling the focal length changing member.

Thus, the focal length changing member can be controlled by the user applying a hand or part of a hand against the window. This makes it possible in particular to ensure that the hand is at a correct distance and in a correct position relative to the camera so as to enable the print to be viewed well enough to enable it to be recognized.

In a second particular embodiment, the device includes a system for automatic face recognition connected to the camera to be activatable when the camera has adopted its visual-observation focal length, and preferably means for causing the focal length changing member to change from the visual-observation focal length to the print-recognition focal length in the event of automatic face recognition failing, and from the print-recognition focal length to the visual-observation focal length in the event of automatic print recognition failing.

Thus, focal length is changed automatically in the event of the current recognition failing.

Preferably, the device includes means for causing the focal length changing member to switch from the print-recognition focal length to the visual-observation focal length without automatic face recognition in the event of both automatic face recognition and automatic print recognition failing.

It is then possible to alert an operator to proceed with visual recognition of the face of the person to be identified.

BRIEF DESCRIPTION OF THE DRAWING

Other characteristics and advantages of the invention appear on reading the following description of particular, non-limiting embodiments of the invention.

Reference is made to the sole accompanying figure which is a diagram of an optical identification device in accordance with the invention.

DETAILED DESCRIPTION OF THE INVENTION

The identification device in accordance with the invention is described herein in association with a device for authorizing access to premises closed by a door 1. By way of example, the access authorization device comprises a lock 2 under electrical control and connected to the identification device in accordance with the invention given overall reference 3.

The identification device comprises a digital camera 4 fixed close to the door 1. The digital camera 4 is of the type having a charge-coupled device (CCD) sensor and also comprises a member 5 for changing focal length between a first focal length adapted to enable the face of a person coming towards the door 1 to be viewed, and a second focal length adapted to enable a fingerprint of that person to be viewed. The camera can thus be fitted with a zoom lens that is motor driven between two predefined focal lengths.

A window 6 is mounted in front of the camera lens 4 and is associated with a switch 7 in such a manner that when pressure is exerted on the window 6 it causes it to be moved slightly and thus to actuate the switch 7. The switch 7 is connected to the device 5 for controlling focal length in order to cause it to operate, and it possesses a first state in which it causes the first focal length to be adopted, and a second state in which it causes the second focal length to be adopted. The switch is caused to change over from its first state to its second state when pressure is applied to the window 6, and the switch is caused to pass from its second state to its first state when the pressure on the window 6 is removed.

The digital camera 4 is connected to a processor unit 8 incorporating a system 9 for automatic face recognition and a system 10 for automatic print recognition. The processor unit 8 is constituted in this case by a computer device. The system 9 for automatic face recognition comprises a database containing the dimensional characteristics of the faces of people authorized to access the premises, and a module for comparing the characteristics of a face being viewed with the characteristics that have been stored. The system 10 for automatically recognizing a print comprises a database containing the characteristics of the fingerprints of people authorized to access the premises, and a comparison module for comparing the characteristics of viewed fingerprints with those that have been stored.

The processor unit 8 is also connected to a display screen 11 and to the lock 2 in order to control it.

With the camera set to its first focal length, while a person is coming up to the door 1, the camera sends at least one image of the face of that person to the processor unit 8. The system 9 for automatically recognizing faces then compares the characteristics of the face being viewed with the characteristics contained in the database.

If the characteristics of the viewed face corresponding to those of one of the faces contained in the database, the processor unit 8 causes the lock 2 to be unlocked.

Otherwise, if the characteristics of the face being viewed do not correspond to those of any of the faces stored in the database of the system 9 for automatically recognizing faces, the person seeking to access the premises is informed, for example by the processor unit causing a lamp situated close to the door 1 to be switched on, that it is necessary to press the hand against the window 6. In so doing, the person actuates the switch 7 which switches to its second state and causes the focal length changing member 5 to adopt the second focal length for viewing fingerprints. An image of the person's fingerprints is then delivered to the processor unit 8. The system 10 for automatically recognizing prints then compares the characteristics of the viewed fingerprints with the characteristics contained in its database.

If the characteristics of the fingerprints of the person correspond to the characteristics of fingerprints stored in the database, then the person is authorized to access the premises.

Otherwise, if the characteristics of the fingerprints do not correspond to any of those that have been stored, the processor unit 8 sends a message to the user, e.g. by means of a lamp, asking the user to take the hand away from the window. The switch 7 then goes back to its first state and causes the focal length changing member 5 to adopt the first focal length for viewing a face. The processor unit 8 then relays the images of the person's face to the screen 11 so as to allow an operator to identify the person visually and possibly ask that person to identify themselves by means of a remote communications device.

In a variant, the processor unit 8 may directly control the focal length changing member 5 so that when automatic face recognition fails the processor unit 8 causes the second focal length to be adopted in order to prepare for automatic print recognition by the system 10 for automatically recognizing prints, and if the automatic print recognition fails, the processor unit 8 causes the first focal length to be adopted in order to allow visual recognition by an operator.

Naturally, the invention is not limited to the embodiment described and variants may be applied thereto without going beyond the ambit of the invention as defined by the claims.

In particular, the window 6 may be arranged to form a touch-sensitive screen controlling the focal length changing member.

In addition, the device could comprise only a system for automatically recognizing prints, with images supplied by the camera when the face viewing focal length is adopted being always relayed to the screen 11 so as to be observed visually by an operator.

Furthermore, the invention may also be applied to controlling access to apartment blocks. The device then advantageously authorizes the inhabitants of an apartment block automatically by recognizing prints, while authorizing visitors to gain access by causing them to be observed visually by the resident concerned by the visit.

The invention claimed is:

1. An optical identification device comprising:
    a digital camera having a focal length changing member for changing between at least one visual-observation focal length and one print-recognition focal length;
    a system for automatic print recognition which is connected to the camera so as to be activated when the camera has adopted the print-recognition focal length; and
    a system for automatic face recognition connected to the camera to be activatable when the camera has adopted its visual-observation focal length;
    wherein the device is further constructed so that if the system for automatic face recognition is activated and successfully recognizes a user's face, the user is authorized and the camera remains at the visual-observation focal length, but if the system for automatic face recognition is activated and fails to recognize the user's face, the device causes the focal length changing member to change the camera to the print-recognition focal length and the system for automatic print recognition is activated, and if the system for automatic print recognition fails to recognize the user's print, the device causes the focal length changing member to change the camera from the print-recognition focal length to the visual-observation focal length.

2. An optical identification device according to claim 1, including a window (6) mounted in front of the camera (4) and associated with means (7) for controlling the focal length changing member (5).

3. An optical identification device according to claim 1, including means (8) for causing the focal length changing member (5) to switch from the print-recognition focal length to the visual-observation focal length without automatic face recognition in the event of both automatic face recognition and automatic print recognition failing.

4. An optical identification device according to claim 1, the optical identification device being associated with a device for authorizing access (2) in order to control said device.

* * * * *